United States Patent [19]

Hadl

[11] 4,246,059
[45] Jan. 20, 1981

[54] METHOD AND APPARATUS FOR FORMING TUBULAR PLASTIC SLEEVES FOR FLAT FOLDING

[75] Inventor: Clyde F. Hadl, Toledo, Ohio

[73] Assignee: Owens-Illinois, Inc., Toledo, Ohio

[21] Appl. No.: 27,114

[22] Filed: Apr. 4, 1979

[51] Int. Cl.³ .................. B29D 23/00; B32B 1/08; B65C 3/20

[52] U.S. Cl. .................. 156/218; 53/410; 53/420; 53/557; 53/585; 156/86; 156/191; 156/194; 156/215; 156/257; 156/443; 156/446; 156/499; 156/DIG. 15; 215/230; 215/246; 428/188

[58] Field of Search .................. 53/291, 409, 410, 420, 53/557, 585; 156/86, 194, 218, 219, 257, 443, 446, 189, 191, 215, 499, DIG. 15; 215/230, 246; 428/188

[56] References Cited

U.S. PATENT DOCUMENTS

| | | | |
|---|---|---|---|
| 2,954,725 | 10/1960 | Palmer | 93/58.1 X |
| 4,013,496 | 3/1977 | Amberg | 156/85 |

Primary Examiner—William A. Powell
Assistant Examiner—Robert A. Dawson
Attorney, Agent, or Firm—E. J. Holler; M. E. Click; D. H. Wilson

[57] ABSTRACT

This invention discloses a method and apparatus for forming a tubular sleeve of a shrinkable cellular polymeric material from a predecorated web. Predecorated neck labels are formed from a web having a pair of cross-dimension score lines in precise location to facilitate flat folding. The neck labels preformed from the web are adapted to overlying the neck and closure of a bottle, for example, to provide a tamper-proof feature. Such labels are formed from a web by cutting a presized blank having, if desired, a partial-depth slit along the longitudinal dimension to provide a parting line, winding the blank on a mandrel while successively forming the score lines in precise location, and then overlapping the ends and seaming the same to make a tubular sleeve having precisely-formed sides adapted to uniform flat-folding. The sleeves are stripped from the forming mandrel, flat-folded and packed into tightly-nested stacks for subsequent use. The sleeves are subsequently opened and applied to the neck and closure of a bottle for heat-shrinking thereon to provide a snug fit.

This disclosure pertains to both novel apparatus and method for making the sleeves from a semi-rigid plastic sheet blank and flat-folding the same for later use. The interior score lines are formed successively interiorly during winding of the blank just prior to heat seaming its ends on the same mandrel to ensure precise location of the score lines for flat-folding.

The present invention relates to method and apparatus for making labels for containers of heat-shrinkable polymeric material which is preprinted or predecorated in web form and then cut to length into individual blanks for forming presized tubular sleeves. The cut blanks are scored in precise location on a forming mandrel and heat sealed into tubular form on the same mandrel to ensure flat-folding. The sleeves may then be packed in nested condition in a multipack for their application and heat-shrinking onto the neck and closure portion of a container in a subsequent operation. The shrunken label also provides a tamper-proof feature for the container.

16 Claims, 9 Drawing Figures

METHOD AND APPARATUS FOR FORMING TUBULAR PLASTIC SLEEVES FOR FLAT FOLDING

BACKGROUND OF THE INVENTION

1. Field of the Invention

This invention relates to the art of making tubular sleeves or bands suitable for application to the neck or neck and closure portion of filled bottles to comprise neck labels, and more particularly to novel method and apparatus for forming such labels from heat-shrinkable relatively-stiff cellular sheet thermoplastic material of appreciable wall thickness to permit their uniform flat folding.

2. Description of the Prior Art

In one method of providing endless bands for necks of bottles, such as salad oil bottles and the like, the banding material has frequently been comprised of thermoplastic material such as polyvinyl or polyethylene, or a cellulose derivative having a high coefficient of shrinkage. In a considerable portion of the manufacture of such banding material, the bands are comprised of films or film-like material which is formed by extrusion as a seamless tube of substantially-circular transverse section. The film tube normally has longitudinal fold-defining lines at opposite sides of its diameter. After the extruded material of the tube is fully hardened, the tube is folded at the fold lines to form a two-ply extremely flexible flat ribbon. The tube ribbon is then taken for use in a banding machine which severs precise axial lengths of such tubing for application to individual bottles. The band is slipped over the neck of the bottle, the band being shrunken in response to physical conditions appropriate to the selected banding material. The band then tightly grips the bottle neck. In some cases, the bottles must be preheated to facilitate uniform application of the bands.

To open the folded ribbon-like strip of tubular material has usually required a pair of juxtaposed suction heads arranged to engage opposite sides of the ribbon at points substantially midway between the fold lines and then separating the suction heads. In the case of film-like materials which are extremely thin and flexible, this operation has often encountered difficulty in that the film tube has stuck to one of the heads and remained unopened, thus failing to mount an individual neck band on a given bottle. Also an adhesive must frequently be employed to attach the heat-contracting flexible material to the bottle neck.

When the neck labels are formed on the banding machine, such as by severing individual lengths of the tubular label stock from rolls, the roll stock must be very precisely severed to align the preprinted or decorated information on each label which patterns can and do vary in length. Also when the number of several labels on a given roll does not equate to the number of bottles to be labeled, small rolls of label stock can and do remain unused and are frequently wasted.

The invention disclosed and claimed in U.S. Pat. No. 4,013,496 to S. W. Amberg, issued Mar. 22, 1977, entitled, "Method For Producing Shrunken Pilfer-Proof Neck Labels On Containers" relates to a production machine and process for producing labelled bottles. This invention pertains to a practical method for applying a hollow tubular sleeve or band of shrinkable cellular polymeric material over the neck and closure skirt portions of a bottle and controlling the wrinkles of the sleeve or band upon heat-shrinkage, resulting in a superior labelled package from the standpoint of appearance and performance. Also, that invention provides a machine capable of automatic production for making the sleeves of shrinkable material from a predecorated or preprinted web supply and assemblying the sleeves onto the upper ends of the capped bottles processed by the machine. The machine provides a sub-assembly structure to move the web past a device for forming cross-flutes or pleats in the material at spaced intervals to minimize wrinkling on heat-shrinkage. That machine forms the sleeves or bands on the machine just prior to their application to the selected containers. The referenced patent does not relate to the pre-manufacture of flat-folded distinctive bands or labels adapted to use on a wide variety of banding or labeling machines for their subsequent application to containers which are not preheated and without the use of bonding adhesives. Also, the plural pleats are formed in the roll stock just prior to wrapping the cut blank on the forming mandrel where its ends are joined; thus, minor differences in the sidewall lengths after end seaming occasionally prevent flat-folding of the bands.

SUMMARY OF THE INVENTION

An object of this invention is to provide a method and apparatus for making flat-folded relatively-stiff tubular bands or sleeves which may be efficiently packed and shipped in multiple packs for expedient and economical application to containers as labels and/or neck bands. A further object of this invention is to provide presized tubular bands or sleeves formed from sheet polymeric material having precisely-located fold lines at opposite sides with a fusion seal along one side intermediate the fold lines, such bands or sleeves adapted to easy opening and use. The tubular banding material is preferably comprised of relatively-stiff cellular thermoplastic material such as foam polystyrene which can be packaged flat in multi-pack units for delivery and use at a neck banding machine, the tubular bands being heat-shrinkable and applicable to surfaces such as bottle necks which are maintained at room temperature.

Further objects and advantages of the invention will be apparent from the following more-detailed description and by reference to the accompanying drawings.

DETAILED DESCRIPTION OF THE INVENTION

Another object of the present invention is to form predecorated shrinkable foamed plastic sleeves from a web or roll of foamed oriented polystyrene plastic, for example, having a thickness ranging from about 10 to 20 mils. The plastic web is delivered to the forming apparatus preferably in a roll mounted on a conventional supply reel. A multicolor printed pattern or decoration is preprinted repeatedly over one surface of the supply web. The printed pattern or decoration for a given label had a longitudinal extent on the web which is lesser than the length dimension of a blank to the severed from the web. Frequently, spaced indicia are printed along the lengthwise dimension of the blank to mark the cutting area. Each patterned or decorative copy is placed on the web between these indicia leaving blank end portions undecorated. The width of the web or blank is essentially equal to the height dimension of the label after it is shrunken on the bottle. The plastic material of the supply web is oriented or stretched in the longitudinal or machine dimension of the web. Only minimal or slight orientation exists in the cross or width dimension of the material.

An important feature of the subject invention is a machine for providing plural score lines across individual severed blanks so that each pair of such score lines permit precise flat-folding of the label in tubular form. The score lines are formed during wrapping of the blank on the forming mandrel in accordance with this invention. The scores extend across the width direction of the web or roll from which the blanks are severed and are generally parallel to the width dimension. The scores are formed normal to the machine direction of the web or roll from which the individual blanks are formed.

Figure 1:
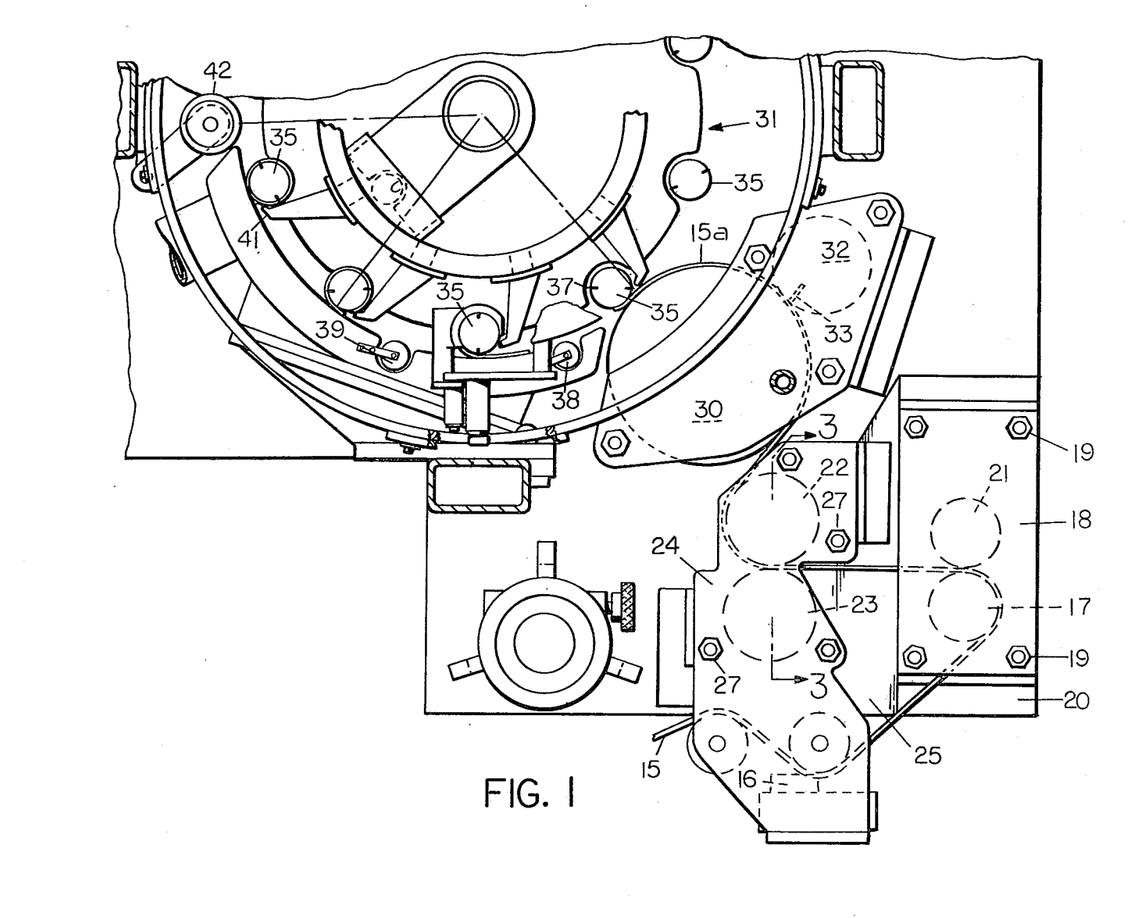
FIG. 1 is a partial top plan view of one portion of the machine for forming tubular sleeves in accordance with the invention.
Figure 2:
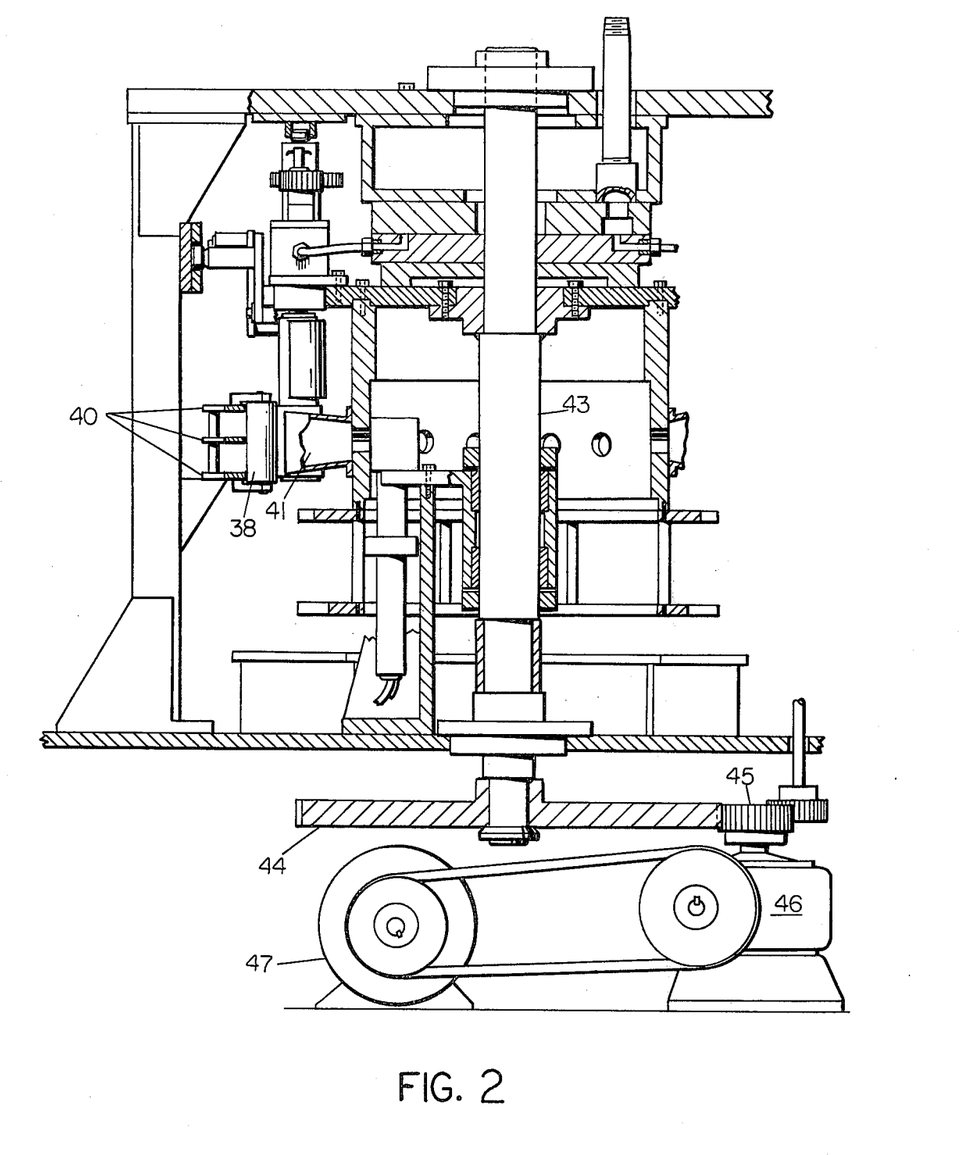
FIG. 2 is a partial vertical sectional view of one portion of the machine shown in FIG. 1.

As shown in FIG. 1, the web or roll of thermoplastic material 15 extends from a slitting device 16 over a pulling roller 17 which is driven pulling the web through the slitting knife and roller. The pull roller 17 is fastened on a vertical shaft mounted in suitable ball bearings located at opposite ends of the pull roller. The top is retained in a seat aperature in the top plate 18 of the roller assembly. The top plate 18 is spaced from the bottom plate by a series of hollow tube supports and bolts 19 which extend through each of the supports to fasten the two plates 18 and 20 together. Bottom plate 20 is welded to angle brackets which are fastened on the top surface of the elevated deck of the machine frame. The lower ball bearing is retained by a seat aperture in the bottom plate and in vertical axial alignment with the top aperture. Pull roller 17 operates in conjunction with a second roller 21 mounted on a vertical shaft in alignment with and adjacent the pull roller.

The drive shaft for the pull roller 17 is connected to drive train element such as disclosed in U.S. Pat. No. 4,013,496 to S. W. Amberg, issued Mar. 22, 1977, and owned by the same common assignee as the present application, which patent disclosure is incorporated herein by reference.

From rolls 17 and 21, the web 15 enters between a guide roll 22 and back-up roll 23. Guide roll 22 is fastened on a vertical shaft rotatably mounted in bearings in aligned seat apertures in the top plate 24 and bottom plate 25. The plates 24 and 25 are rigidly connected by hollow cylinder columns 26 each having a bolt 27 extending through the column and the several plates.

Figure 3:
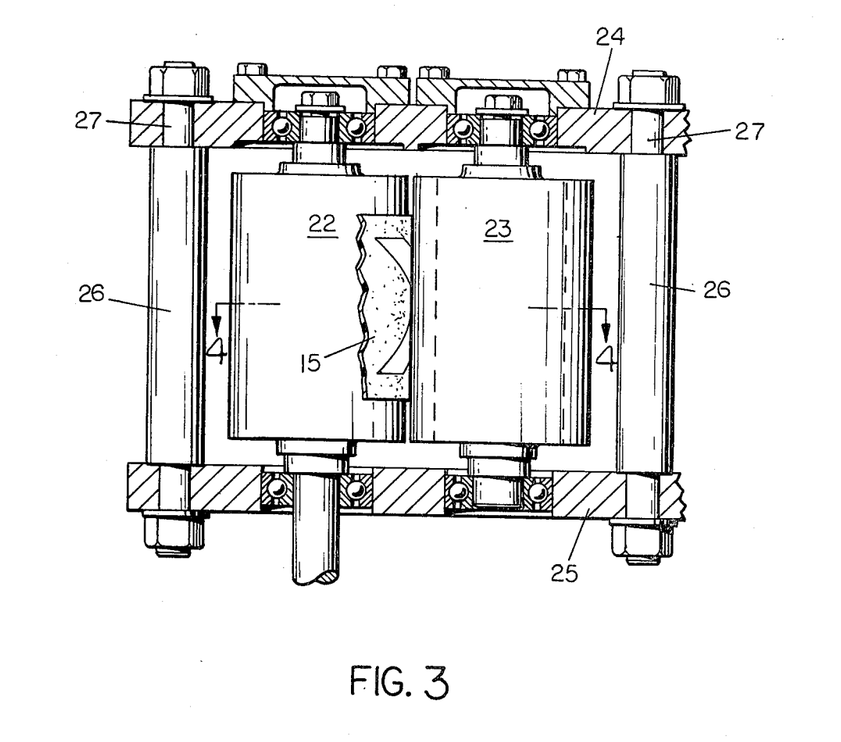
FIG. 3 is a vertical sectional view taken along the line 3—3 on FIG. 1.
Figure 4:
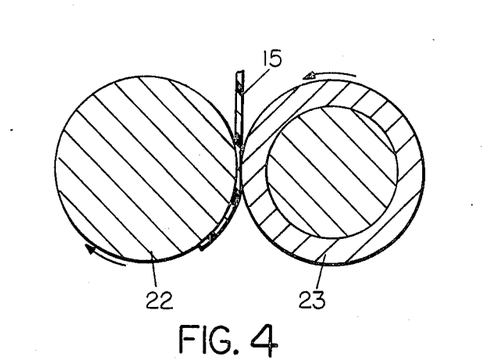
FIG. 4 is a fragmentary sectional view taken along the line 4—4 on FIG. 3.

Back-up roll 23 is formed of a steel cylindrical core having a smooth surface covered with a uniform depth layer or sleeve of rubber or like yieldable resilient material. Guide roll 22 is mounted on a vertical shaft which is supported by ball bearings in top plate 24 and ball bearings in bottom plate 25 of the frame structure. Roll 23 is freely rotatable and is driven by nip engagement with the surface of the web 15 traveling between rolls 22 and 23. The circumference of guide roll 22 is generally equal to the length dimension of the label blank to be severed. In the example on the drawings as shown in FIGS. 1, 3 and 4, the label stock 15 is transported in vertical relation from rolls 22 and 23 to the severing and feed drum 30 where individual blanks are severed serially from the web.

Feed drum 30 is positively rotated in a position tangential to the machine turret 31. A cutter roll 32 is also mounted in tangential relation to the feed drum 30 to permit severance of the blanks 15a from the web stock 15. The stock is held on the feed drum by vacuum so that the blanks may be severed by a cutter element 33 contacting and being forced through the sheet at spaced intervals. The feed drum is preferably hard surfaced and the cutter element 33 is brought into close proximity during the cutting operation. The cutter roll 32 has one cutter element 33 thereon to sever the desired uniform length blanks of thermoplastic material. The feed rolls 22 and 23 control the rate of delivery of the web stock to the feed drum 30 on which the uniform blanks are severed.

The blanks 15a are fed off the feed drum onto individual mandrels 35 mounted in series on the rotary turret 31 of the machine. The mandrels 35 are right-cylindrical in shape having a length slightly greater than the blank width. The mandrels are mounted in vertical equi-spaced relation around the periphery of the machine turret. Each mandrel is rotated during its interval of wrapping the blank thereon upon its delivery from the feed drum 30. Each mandrel has an axially-extending series of apertures which are connected to a vacuum line to retain the leading edge of the blank 15a thereon during wrapping. The mandrels each have precisely similar diameters and axial dimensions so that when the blanks are individually wrapped therearound, the ends of the blank are overlapped to a slight extent to permit their being sealed into tubular form.

Figure 5:
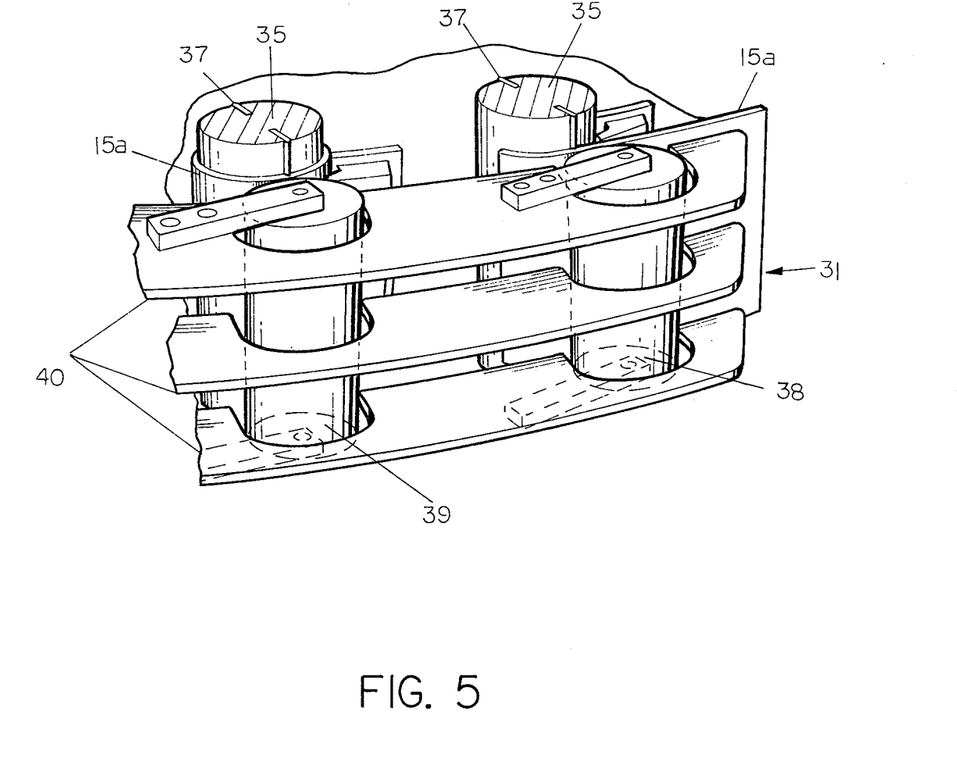
FIG. 5 is an enlarged fragmentary perspective view of successive mandrels and juxtaposed rollers for forming score lines in the blanks on the machine turret.
Figure 6:
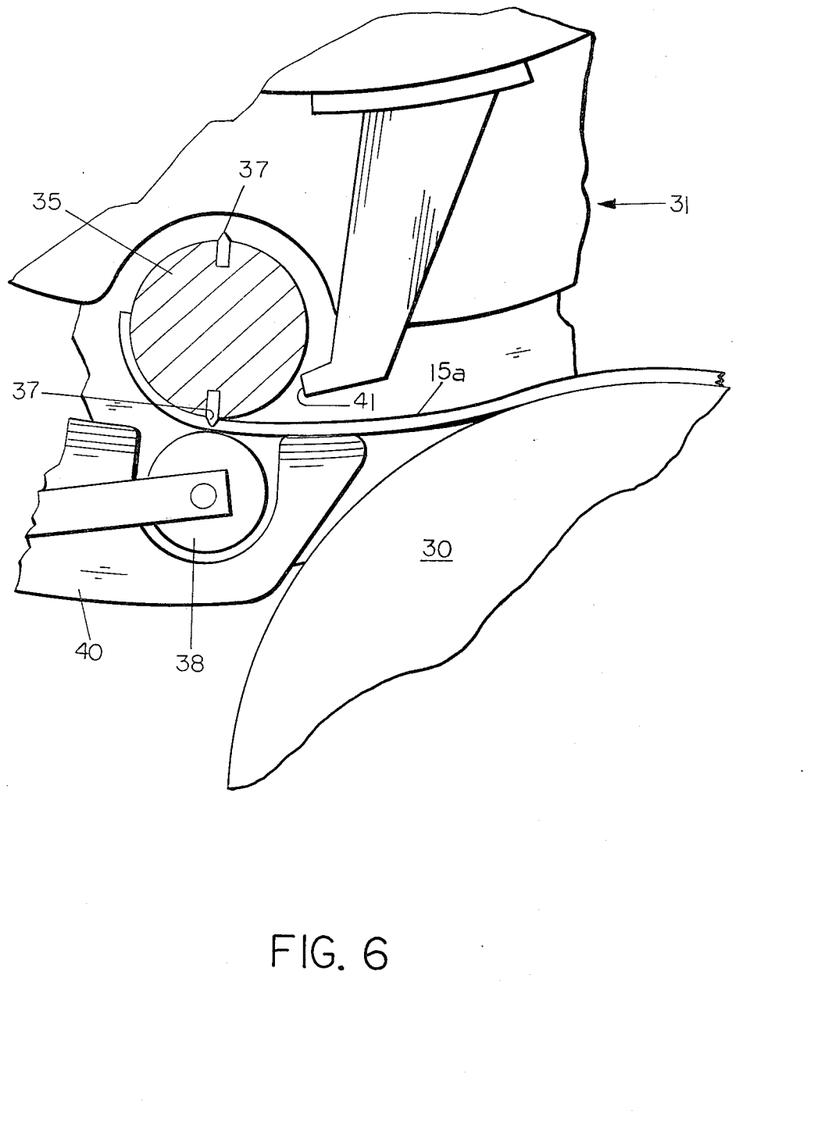
FIG. 6 is an enlarged fragmentary sectional plan view of an individual forming mandrel and scoring roller on the machine turret as shown in FIG. 5.
Figure 7:
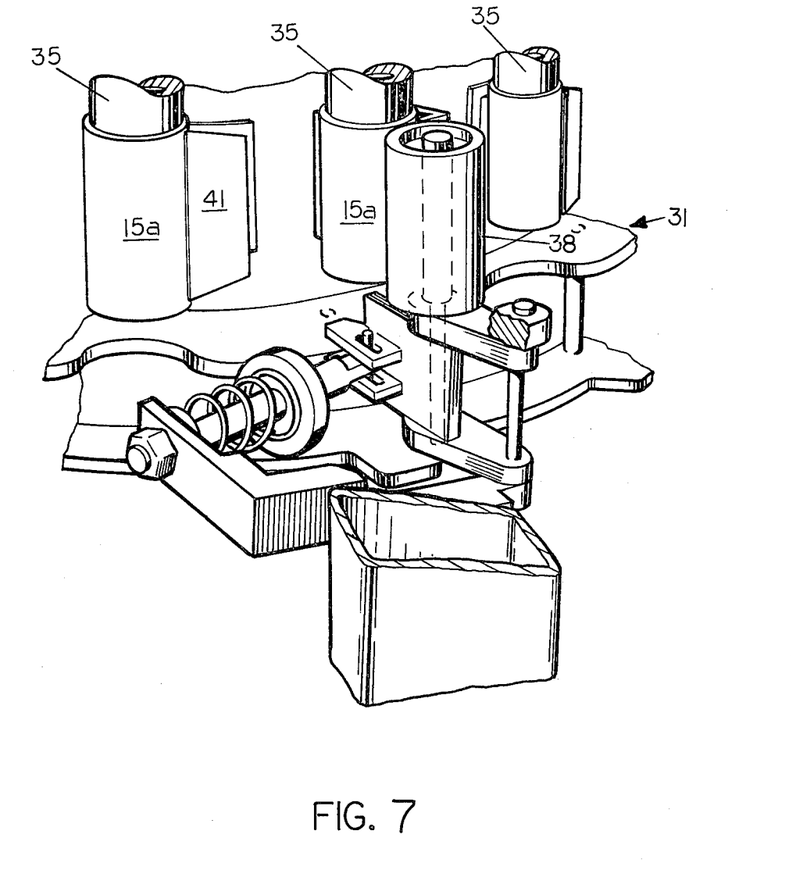
FIG. 7 is an enlarged fragmentary perspective view of the individual forming mandrels and one scoring roller on the machine turret as shown in FIG. 6.

As the leading edge of the blank 15a is fed to an individual mandrel 35, it is forcefully engaged by the lineal series of vacuum apertures and the blank is wrapped around the smooth cylindrical surfaces of the mandrel. Each mandrel 35 has a pair of juxtaposed relatively-sharp axial projections 37 extending from its exterior surface in diametrically-opposed relation. The projections are designed to form deep axially-aligned sharp indentations in the inner surface of the blank. The projections are generally blade-like and have a vertical extent of about 0.030 inch above the mandrel surface.

As the first projection is rotated with the blank thereover, an externally-mounted first compression roll 38 which has a resilient surface and is freely rotatable serves to exert pressure on the blank lineal portion intermediate the projection 37. As the rotation of the blank on the mandrel 35 and the turret 31 is continued, the second juxtaposed axial projection 37 is brought beneath a second compression roll 39 having a resilient surface to form the second similar score line in the blank. The spacing between the individual score lines is very precise in their being formed progressively and successively as the blank is wrapped on the mandrel. The second pressure roll 39 is mounted in tangential freely-rotatable relation to the mandrels to contact the blank exterior surface firmly during the interval when the second axial projection 37 is rotated therebeneath. Both resilient compression rolls 38 and 39 serve to apply uniform axial pressure on the work product or blank on the mandrel.

Several acrcuately-shaped spaced-apart horizontal guide rails 40 are located around the periphery of the turret arranged in stationary stacked-array relation with respect to the mandrels extending on both sides of compression rolls 38 and 39. Rails 40 are interrupted in the area of the rolls 38 and 39 and serve to assist the blank 15a into firm contact with the mandrel.

A hot air outlet aperture 41 is mounted adjacent each mandrel 35 on the turret facing the area where the blank ends meet when overlapped. Such outlet serves to deliver a stream of hot air onto the end portions to permit their softening for heat sealing.

The blanks after being fully wrapped and scored on the mandrel 35 are then moved to the sealing station at which time the blank is fully wrapped with its ends overlapping as shown in FIG. 1. Sufficient heat has been delivered to the ends at their meeting faces to obtain a heat softening. The hot air outlets 41 are operated to heat the blank ends immediately following complete wrapping as rotation of the mandrel is stopped and the mandrel is moved to the sealing station. At such station, a third pressure roll 42 is arranged in tangential relation to the turret to firmly contact the softened overlapped ends of the blank. Such function is performed while the mandrel is not rotated but is moved arcuately by turret rotation.

Mandrel turret 31 is supported by a series of vertical frame members. At an upper region of the turret is mounted a circular vacuum manifold in stationary position. A vertical turret shaft or column 43 is supported at the bottom and extends centrally through the turret and the central circular vacuum manifold. A ring gear 44 is fastened to the lower end of the vertical shaft or column and a pinion gear 45 is used to drive the ring gear through the output power shaft of a gear box 46 which is driven by an electric motor 47. The details of such machine are set forth in U.S. Pat. No. 4,013,496, to S. W. Amberg, issued Mar. 22, 1977, which is owned by the same common assignee as the present invention.

Figure 8:
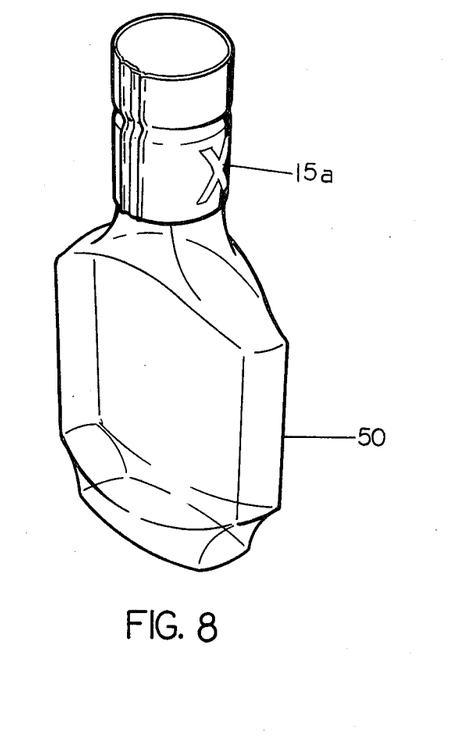
FIG. 8 is a perspective view of a bottle and shrunken label, the latter made in accordance with the present invention.
Figure 9:
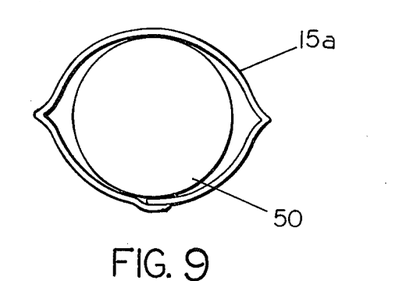
FIG. 9 is a top plan view of the bottle and label made in accordance with the invention just prior to shrinking of the label.

The sleeves when made are removed from the mandrels and due to the opposing inner score lines are folded flat for storage in a multi-pack. The sleeves being semi-rigid are able to be quickly opened for application to a bottle 50 as shown in FIGS. 8 and 9. The fold areas permit temporary retention of the sleeve on the bottle by friction, as shown in FIG. 9 just prior to its heat shrinkage such as upon passage through a tunnel oven. The sleeve 15a in final heat-shrunk form is able to conform snugly to the bottle and closure surfaces therebeneath.

Various modifications can be resorted to within the spirit and scope of the appended claims.

I claim:

1. The method of forming a tubular preform article of prescribed axial and circumferential dimensions of thermoplastic material adapted to flat folding comprising the steps of wrapping a predecorated and sized rectangular blank on a cylindrical mandrel, said mandrel having a pair of relatively-sharp axial projections located in diametrically-opposite positions on its cylindrical surface, applying pressure from an exterior source to the said blank at each of said axial projections progressively during such wrapping on said mandrel to form precisely-located axial internal score lines in said blank to facilitate its flat folding, overlapping the ends of said blank on said madrel, and heat sealing the overlapped ends of said blank while retained on said mandrel to form a fusion seal, the said tubular preform being precisely sized and readily adapted to flat folding.

2. The method of forming a tubular preform article in accordance with claim 1, including the steps of successively applying pressure to said blank by a resilient roller forced toward said mandrel with said blank therebetween at each said axial projection.

3. The method of forming a tubular preform article in accordance with claim 1, including the steps of wrapping said rectangular blank on said cylindrical mandrel by rotation of said mandrel, forcing a first resilient roller against said blank with a first axial projection therebeneath during such rotation, forcing a second resilient roller against said blank with a second axial projection therebeneath during further rotation, and heat sealing the overlapped ends of said blank into an axial fusion seal following wrapping of said blank with said mandrel in stationary relation.

4. The method of forming a tubular preform article in accordance with claim 1, including the step of retaining the leading edge of said blank on said mandrel by vacuum during wrapping.

5. The method of forming a tubular preform article in accordance with claim 1, including the steps of heat sealing the overlapped ends of said blank with a hot air stream to soften juxtaposed portions of said overlapped ends, and applying compressive pressure to said softened juxtaposed portions of said blank to form a fusion seal thereat.

6. The method of forming a presized tubular preform article of thin sheet foamed semi-rigid thermoplastic material adapted to flat-folding comprising the steps of severing to prescribed size a rectangular blank of said foamed semi-rigid thermoplastic material having at least one predecorated surface, wrapping said blank on a rotary cylindrical mandrel during its rotation with the predecorated surface facing exteriorly, said mandrel having a pair of blade-like axial projections located in diametrically-opposite locations on its cylindrical surface, retaining the leading edge of said blank on said mandrel by vacuum during said wrapping, progressively applying compressive force to said blank during such wrapping at each of said blade-like axial projections by a least one cylindrical resilient roller mounted in tangential relation to said mandrel to form a pair of precisely-located axial internal score lines in said blank to facilitate its flat-folding, and heat seaing the overlapped ends of said blank while retained on said mandrel in stationary relation to form an axial fusion seal thereat intermediate said score lines, said preform article being precisely sized and capable of flat folding.

7. The method of forming a presized tubular preform article in accordance with claim 6, including the steps of heat sealing the overlapped ends of said blank with a hot air stream to soften axially-extending contacting portions of said overlapped ends, and applying a compression member against the softened end portions of said blank to form a fusion seal thereat.

8. The method of forming a presized tubular preform article in accordance with claim 6, including the steps of forcing a first resilient roller against said blank with a first axial projection therebeneath during such rotation and forcing a second resilient roller against said blank with a second axial projection therebeneath during further rotation, said heat seal being formed on one side of said tubular preform intermediate and spaced-apart from said score lines during non-rotation of said blank.

9. Apparatus for forming a presized tubular preform article from a thin sheet blank of semi-rigid foamed thermoplastic material comprising a rotary cylindrical mandrel, means for rotating said mandrel, a pair of blade-like projections extending axially in diametrically-opposite locations on the cylindrical surface of said mandrel, a series of axially-extending apertures in the cylindrical surface of said mandrel intermediate said projections, vacuum means connected to said axial series of apertures to retain the leading edge of said blank on said mandrel by vacuum to facilitate wrapping, at least one cylindrical resilient roller mounted in tangential relation to said mandrel adapted to applying compressive force to said blank positioned intermediate said blade-like axial projections on said mandrel to form a pair of precisely-located internal score lines in said blank to permit precise flat-folding, and heat-sealing means to join overlapped heat-softened ends of said blank on said mandrel to form an axial fusion seal intermediate said score lines.

10. Apparatus for forming a presized tubular preform article in accordance with claim 9, including a pair of cylindircal resilient rollers each mounted in tangential relation in rotational alignment with one blade-like axial projection on said mandrel adapted to progressively applying compressive force to said blank at said projections during rotation of said mandrel to successively form said score lines.

11. Apparatus for forming a presized tubular preform article in accordance with claim 10, including a series of similar rotary cylindrical mandrels each mounted in vertical relation on a rotary turret, means for rotating each said mandrel on said turret, and means for rotating said pair of cylindrical resilient rollers in contact with said blank during its wrapping on said mandrel to successively form said pair of precisely-located score lines for flat-folding.

12. Apparatus for forming a presized tubular preform article in accordance with claim 11, including a pair of cylindrical resilient rollers each mounted to contact said rotary cylindrical mandrel in juxtaposition to one of said blade-like projections on said mandrel with said blank therebetween.

13. Apparatus for forming a presized tubular preform article in accordance with claim 9, wherein said pair of blade-like projections extending axially in diametrically-opposed locations on said mandrel each have a radial dimension of about 0.030 inch above the said mandrel cylindrical surface.

14. Apparatus for forming a presized tubular preform article in accordance with claim 9, wherein said mandrel and said resilient roller have generally similar diameters and axial dimensions.

15. Apparatus for forming a presized tubular preform article in accordance with claim 9, wherein said heat-sealing means comprises an outlet aperture for a hot air stream co-extensive with the major axial dimension of said mandrel and mounted closely adjacent thereto adapted to impinge upon the overlapped ends of said blank on said mandrel, and a compression roll mounted adjacent said mandrel adapted to apply compressive force to the overlapped ends of said blank on said mandrel to form an axial fusion seal intermediate the juxtaposed score lines.

16. Apparatus for forming a presized tubular preform article in accordance with claim 9, wherein said vacuum means comprises a vacuum manifold and vacuum line connected to said axial series of apertures in said mandrel for retaining said blank during its wrapping.

* * * * *